3,282,047
PURIFYING APPARATUS TO ELIMINATE AIR POLLUTION FROM AUTOMOTIVE, INDUSTRIAL AND COMMERCIAL EXHAUST PRODUCTS
Sidney B. Wertheimer, 7403 Woodmar Ave., Hammond, Ind.
Filed Feb. 23, 1965, Ser. No. 434,547
4 Claims. (Cl. 60—30)

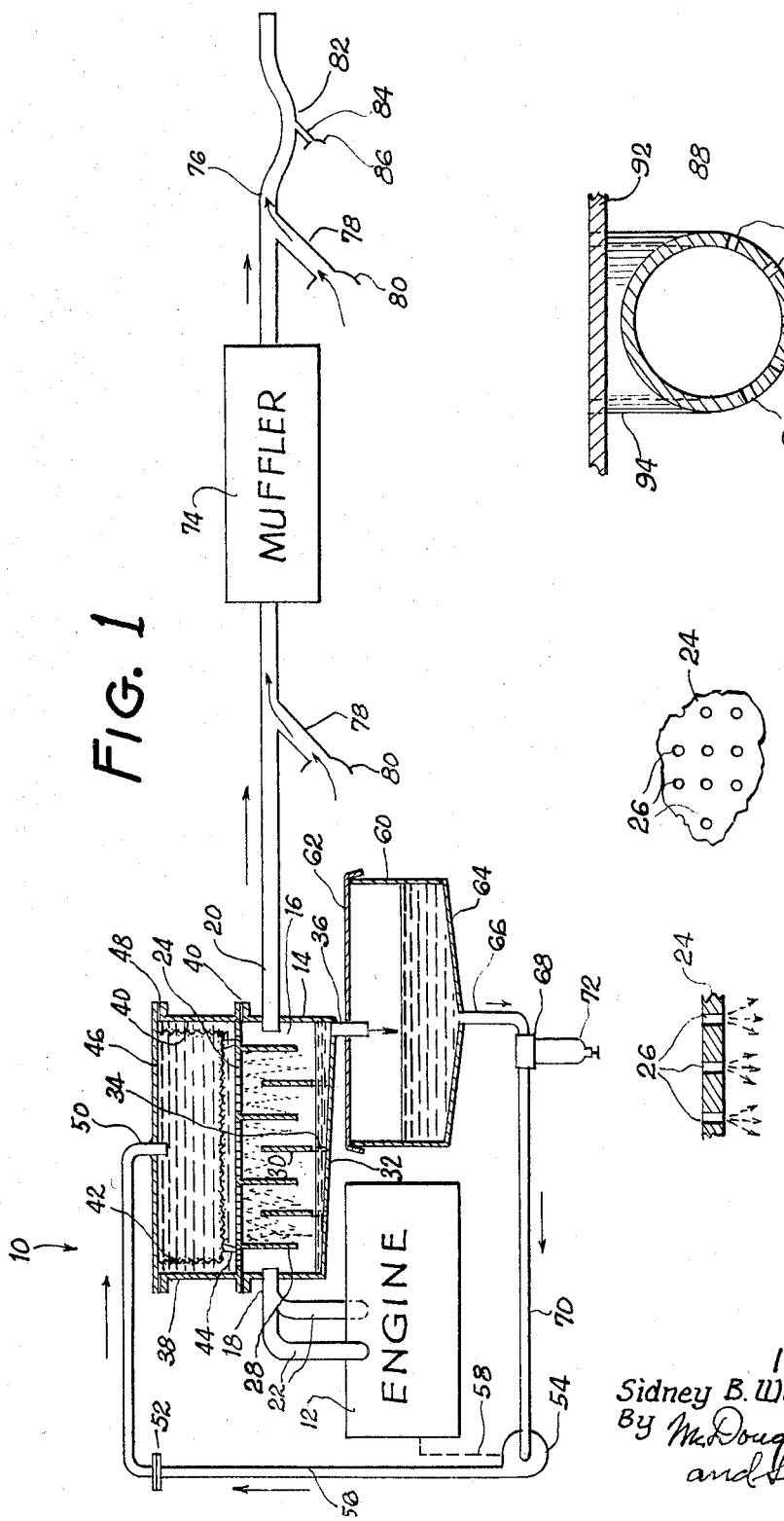

This invention relates to a new and improved apparatus for eliminating air pollution due to automotive exhaust products, or similar waste gases and products from industrial and commercial establishments.

One object of the present invention is to provide a new and improved purifying apparatus in which the exhaust gases and products are caused to pass through a chamber through which a purifying liquid or solution is sprayed so as to come into intimate contact with the waste gases and products. In this way, the waste products are cleaned and purified both mechanically and chemically, so that the noxious components which would cause air pollution are removed from the waste products and are carried away by the purifying liquid.

A further object is to provide such a new and improved apparatus in which the purifying liquid is recovered and recirculated for repeated use.

Another object is to provide such an apparatus in which the recirculating system includes a pump which may be driven by the automotive engine which is the source of the waste products to be purified.

A further object is to provide such a new and improved apparatus in which the system for recirculating and purifying liquid includes a filtering device for removing sediment and suspended particles from the liquid before it is used again.

Another object is to provide such a new and improved apparatus which is compact and readily adaptable for use on all new and used automobiles and trucks, to eliminate air pollution due to the exhaust products and fumes from the engines of the automobiles or trucks.

It is a further object to provide an air pollution eliminating apparatus which is highly efficient yet low in cost and economical to operate.

Further objects and advantages of the present invention will appear from the following description, taken with the accompanying drawings, in which:

FIG. 1 is a diagrammatic elevational section showing a purifying apparatus for eliminating air pollution due to the exhaust gases from an automotive engine, such apparatus constituting an illustrative embodiment of the present invention.

FIG. 2 is an enlarged fragmentary sectional view taken through the spray producing member as employed in the apparatus of FIG. 1.

FIG. 3 is a fragmentary plan view of the spray member of FIG. 2.

FIG. 4 is a fragmentary section showing a spray producing member of modified construction.

As already indicated, FIG. 1 illustrates a purifying apparatus 10 for greatly reducing and virtually eliminating air pollution due to the exhaust gases and products from an automotive engine 12. It will be understood that the apparatus of FIG. 1 is also applicable to the control of air pollution due to the waste gases and products from industrial and commercial establishments. The air pollution control apparatus 10 is applicable to all types of automobiles, trucks and other automotive vehicles, so that the engine 12 may be considered to be any of the usual types of internal combustion engines for automotive service.

The illustrated purifying apparatus 10 comprises a main housing 14 having a purifying chamber 16 therein. The housing 14 is preferably of a generally rectangular shape, but it may be of any desired or suitable shape.

The exhaust gases and products from the engine 12 are caused to pass through the chamber 16 in the housing 14. The exhaust products are carried into the chamber 16 by an inlet pipe 18 which is connected to one end of the housing 14. A discharge pipe 20 is connected to the opposite end of the housing 14 to carry away the purified exhaust gases from the chamber 16.

The illustrated engine 12 has dual exhaust pipes 22, both of which are connected to the inlet pipe 18, in this instance. However, it will be understood that two separate housings 14 may be provided for the dual exhaust pipes 22, if desired.

In order to remove air polluting products from the exhaust gases, a purifying liquid is sprayed into the chamber 16 through a spray member or head 24, which preferably has a large number of spray openings 26 therein. The spray member 24 illustrated in FIG. 1 is in the form of a perforated plate which extends across the top of the main housing 14.

If desired, a series of baffle plates 28 and 30 may be provided within the chamber 16, so as to force the exhaust gases to travel along a serpentine path. In this way, a higher degree of intimate contact between the purifying liquid and the exhaust gases is assured. The illustrated baffle plates 28 extend downwardly from the spray plate 24, while the baffle plates 30 extend upwardly from the bottom wall 32 of the housing 14. The lower baffle plates 30 are interspersed between the upper baffle plates 28. Each of the lower baffle plates 30 is formed with one or more openings 34 adjacent the bottom wall 32 so that the liquid collected on the bottom wall may pass through the openings. The bottom wall 32 is inclined so that the collected liquid will drain toward an outlet pipe 36.

The purifying liquid is supplied under pressure to the spray member 24 from an upper pressure housing 38 which is disposed above the main housing 14. The pressure housing 38 is formed with a chamber 40 which is in communication with the spray openings 26 in the spray member 24.

In this case, the spray plate 24 forms the bottom wall of the upper housing 38. The spray plate 24, along with the upper housing 38, is removably mounted on the top of the lower housing 14. A gasket 40 is mounted between the spray plate 24 and the lower housing 14 to prevent leakage of the exhaust gases and the purifying liquid.

Within the upper housing 38, it is preferred to mount a filter, which may be in the form of a filter basket 42. The material employed in the filter basket 42 may be a fine wire mesh, perforated metal, or any other suitable filtering material. The illustrated filter basket 42 is formed with legs 44 to raise the bottom of the filter basket above the spray plate 24 so that the filtered liquid may pass freely to the opening 26 in the spray plate. It will be understood that the filter basket 42 removes sediment and suspended particles from the purifying liquid before it passes to the spray plate 24. From time to time, the spray basket 42 may be removed from the housing 38 and cleaned. To provide for such removal of the spray basket, the housing 38 is fitted with a removable top wall or cover 46. A gasket 48 is provided between the cover 46 and the upper housing 38 to prevent leakage of the purifying liquid.

The purifying liquid is supplied to the upper housing 38 by a pipe or conduit 50 which extends through and is secured to the cover 46. A joint 52 may be provided in the pipe 50 to facilitate the removal of the cover 46 from the upper housing 38.

It is preferred to provide an impeller pump 54 for supplying the liquid under pressure to the upper housing 38. A discharge pipe 56 extends from the pump 54 and is connected to the pipe 50 at the joint 52.

The pump 54 is preferably driven by the engine 12. Thus, a driving connection 58, indicated diagrammatically in FIG. 1, is provided between the engine 12 and the pump 54. The driving connection 58 may utilize a drive belt, chain, gears or the like. With this arrangement, the pump 54 is driven whenever the engine 12 is running. Thus, whenever exhaust gases are being produced, the pump 54 will deliver the purifying liquid to the upper housing 38.

The pump 54 is employed to recirculate the purifying liquid for repeated use. As already indicated, the liquid is collected in the bottom of the main housing 14 and is allowed to drain out of the housing through the outlet pipe 36. The suction side of the pump 54 may be connected directly to the outlet pipe 36. However, it is preferred to employ a supply tank or sump 60 between the outlet pipe 36 and the pump 54. The tank 60 holds a reserve supply of the purifying liquid. As shown, the tank 60 has a removable top wall 62 and a sloping bottom wall 64 so that the liquid will drain toward an outlet pipe 66.

In this case, a filter trap 68 is connected between the pipe 66 and another pipe 70 which is connected to the suction side of the pump 54. The filter trap 68 is adapted to remove sediment from the purifying liquid. The sediment is collected in a bowl 72 which may readily be removed from the trap 68 so that the sediment may be cleaned out. The entire system may also be drained by removing the bowl 72.

The purifying liquid may comprise a water or lime water base solution which contains suitable additives to prevent the liquid from freezing. Alternatively, the liquid may comprise an oil base solution or chemical. The liquid contains chemicals which oxidize, absorb and decompose the various components of the exhaust gases which would otherwise produce air pollution. In this way, the purifying liquid is capable of removing many noxious products from the exhaust gases including oxides of nitrogen and sulfur, carbon monoxide, carbon dioxide, unburned gasoline, solid particles, oil smoke and other blowby gases.

The pipe 20 carries the purified exhaust gases from the main housing 14 to a muffler 74, which may be of the usual construction. A tail pipe 76 extends rearwardly from the muffler and discharges the purified exhaust gases into the atmosphere at the rear of the vehicle.

It is preferred to inject pure air into the discharge pipe 20 and also into the tail pipe 76 so as to promote oxidation and cooling of the exhaust gases. To introduce the air, side tubes or pipes 78 are connected to the discharge pipe 20 and the tail pipe 76. It will be seen that the pipes 78 are connected diagonally to the pipes 20 and 76 so that the flow of the exhaust gases will tend to draw air into the pipes 78. To promote the flow of air, air scoops 80 are preferably connected to the entrance ends of the pipes 78. The air scoops 80 pick up air due to the speed of the vehicle. The pipes 78 also serve to drain any condensed water from the pipes 20 and 76.

The pipes 20 and 78 may have one or more low points 82 from which condensed water may be drained by drain tubes 84 which may be of small size. If desired, an air scoop 86 may be connected to the lower end of each drain tube 84. In this way, additional air will be introduced into the exhaust system by the drain tube or tubes 84.

The spray member for spraying the purifying liquid into the purifying chamber may take various forms. Instead of being in the form of the plate 24, as in FIGS. 1–3, the spray member may comprise one or more spray tubes 88 having spray openings 90 therein, as shown in FIG. 4. The spray tube 88 may be mounted on a bottom plate 92 which is secured to the bottom of the upper housing 38 in place of the spray plate 24. The spray tube 88 has an end portion 94 which extends through the bottom plate 92 so that the purifying liquid will be supplied to the spray tube.

The purifying apparatus of the present invention removes air polluting components from the exhaust gases with a high degree of efficiency. Whenever the engine 12 is started, the pump 54 supplies the purifying liquid to the upper housing 38 so that the liquid is sprayed through the spray member 24 into the main housing 14. The sprayed liquid comes into intimate contact with the exhaust gases as they pass through the main housing 14.

The liquid collects in the bottom of the main housing 14 and drains into the supply tank 60, from which the liquid is withdrawn by the pump 54. Before travelling to the pump, the liquid passes through the filter trap 68.

When the engine 12 is stopped, the liquid drains out of the upper housing 38 and into the main housing 14, from which it passes into the supply tank 60. However, when the engine is again started, the pump 54 again fills the upper housing 38 with the purifying liquid.

At periodic intervals, the supply of purifying liquid may be replenished by adding additional liquid to the system. Periodically, the used liquid may be drained out of the system by removing the filter bowl 72. The sediment collected in the filter bowl is then removed before the bowl is replaced. The filter basket 42 in the upper housing 38 should also be removed so that the collected sediment may be cleaned from the basket.

The air pollution eliminating apparatus of the present invention may readily be installed on all new and used automobiles, trucks and other automotive vehicles. Normally, the apparatus of the present invention is installed in the engine compartment under the hood of the vehicle. Thus, the purifying apparatus is readily accessible for replenishment of the purifying liquid and periodic cleaning of the system. The apparatus is low in cost and economical to operate.

The exhaust gases pass easily through the purification chamber in the apparatus of the present invention, so that the apparatus does not produce any appreciable back pressure in the exhaust system. Thus, the apparatus does not have any adverse affect upon the performance of the engine.

Various other modifications, alternative constructions and equivalents may be employed without departing from the true spirit and scope of the invention, as exemplified in the foregoing description and defined in the following claims.

I claim:
1. In an apparatus for cleaning and purifying waste gases,
   the combination comprising a main housing having a chamber therein,
   an inlet pipe connected to one end of said housing for conducting the waste gases into said chamber,
   a discharge pipe connected to the opposite end of said housing for carrying away the purified gases,
   a tank mounted above said housing containing a purifying liquid,
   a finely perforated member in the upper end of said chamber and connected to said tank for spraying the purifying liquid into said chamber and into intimate contact with the waste gases passing through said chamber,
   a filter basket in said tank for filtering the liquid before allowing it to pass to said perforated member.
   a liquid outlet pipe connected to the lower end of said housing for removing the liquid from said chamber,
   and a pump for recirculating the liquid from said outlet pipe to said tank.
2. In an automotive vehicle, the combination comprising an internal combustion engine having an exhaust pipe connected thereto for exhausting waste gases and products therefrom, a purification housing having a chamber therein, said exhaust pipe being connected to one end of said housing for delivering the waste gases and products to said chamber, a discharge pipe connected to the opposite end of said housing for discharging the purified gases from said chamber, a side pipe leading diagonally from the atmosphere into said discharge pipe for injecting air into said discharge pipe, said side pipe having an air scoop connected to the entrance end thereof, a perforated member for spraying purifying liquid into the upper portion of said chamber, a tank above said housing for delivering the purifying liquid to said perforated member, a filter screen in said tank for filtering the liquid before allowing it to pass to said perforated member, a pump having its discharge side connected to said tank for delivering the purifying liquid thereto, said engine having a driving connection to said pump, and a conduit system for carrying the liquid from the lower end of said housing to the suction side of said pump to recirculate the liquid, said conduit system including a filter trap for removing sediment from the liquid.

3. In an apparatus for purifying waste gases, the combination comprising a first housing having a purification chamber therein, inlet and exhaust pipes connected to said first housing for carrying the waste gases into and out of said chamber, a second housing removably mounted on said first housing, a perforated spray member interposed between said second housing and said first housing for causing a purifying liquid to be sprayed into said chamber in said first housing, a filter basket received in said second housing, a removable cover on said second housing to provide for removal of said filter basket therefrom, a pump, means for withdrawing the used liquid from said first housing and supplying the used liquid to the suction side of said pump, and means for carrying the liquid from the discharge side of said pump to said second housing, said pump being effective to recirculate the used liquid into said second housing.

4. In an apparatus for cleaning and purifying waste gases, the combination comprising a main housing having a chamber therein, an inlet pipe connected to one end of said housing for conducting the waste gases into said chamber, a discharge pipe connected to the opposite end of said housing for carrying away the purified gases, a filter housing for receiving a purifying liquid, a finely perforated member in the upper end of said chamber and connected to said filter housing for spraying the purifying liquid into said housing and into intimate contact with the waste gases passing through said chamber, a filter element in said filter housing for filtering the liquid before allowing it to pass to said perforated member, a removable cover on said filter housing to provide for the removal of said filter element therefrom, a pump for recirculating the liquid, a closed collecting system connected between said chamber and the suction side of said pump, and a closed pressure conduit system connected between the discharge side of said pump and said filter housing.

References Cited by the Examiner
UNITED STATES PATENTS

| | | | |
|---|---|---|---|
| 984,212 | 2/1911 | Gray. | |
| 1,891,170 | 12/1932 | Nose | 60—30 |
| 2,773,735 | 12/1956 | Ruth. | |
| 3,214,902 | 11/1965 | Maring | 60—30 |

MARK NEWMAN, *Primary Examiner.*

RALPH D. BLAKESLEE, CARLTON R. CROYLE,
*Examiners.*